United States Patent [19]

Johnson et al.

[11] Patent Number: 4,707,106

[45] Date of Patent: Nov. 17, 1987

[54] MULTIPLE FORMAT CAMERA AND ACCESSORY

[75] Inventors: Bruce K. Johnson, Andover, Mass.; Juan Estévez, Enschede, Netherlands; Robert M. Goward, Bow, N.H.; George D. Whiteside, Lexington, Mass.

[73] Assignee: Polaroid Corporation, Cambridge, Mass.

[21] Appl. No.: 835,299

[22] Filed: Mar. 3, 1986

[51] Int. Cl.⁴ .................. G03R 7/099; G03B 11/00; G03B 17/12

[52] U.S. Cl. .................................. 354/481; 354/122; 354/295

[58] Field of Search ............... 354/481, 110, 111, 120, 354/122, 195.12, 209, 219, 222, 286, 295

[56] References Cited

U.S. PATENT DOCUMENTS

| | | | |
|---|---|---|---|
| 2,232,440 | 2/1941 | DeBisschop | 88/1.5 |
| 3,283,685 | 11/1966 | Cummins | 95/18 |
| 3,318,218 | 5/1967 | Yax | 354/122 |
| 3,443,499 | 5/1969 | Gianino | 95/18 |
| 3,719,128 | 3/1973 | Simmons | 95/36 |
| 3,747,490 | 7/1973 | Brandt | 354/286 |
| 3,762,198 | 4/1973 | Bjork et al. | 95/37 |
| 3,940,775 | 2/1976 | Bodnar | 354/122 |
| 3,967,349 | 6/1976 | Forsyth et al. | 354/286 |
| 4,012,748 | 3/1977 | Lemanski | 354/122 |
| 4,040,072 | 8/1977 | Johnson et al. | 354/173 |
| 4,053,910 | 10/1977 | Bodnar | 354/120 |
| 4,140,381 | 2/1979 | Douglas | 354/111 |
| 4,175,843 | 11/1979 | Douglas | 354/31 |
| 4,219,264 | 8/1980 | Rodeck | 354/295 |
| 4,227,789 | 10/1980 | Driscoll et al. | 354/86 |
| 4,231,645 | 11/1980 | Davis et al. | 354/145 |
| 4,345,830 | 8/1982 | Aratame | 354/209 |
| 4,383,746 | 5/1983 | Aratame | 354/209 |
| 4,427,279 | 1/1984 | Edelstein et al. | 354/107 |
| 4,490,031 | 12/1984 | Mineshima | 354/481 |

Primary Examiner—Russell E. Adams
Attorney, Agent, or Firm—David R. Thornton

[57] ABSTRACT

Photographic apparatus including a camera and a masking accessory kit in which the camera may be adjusted between a fully automated single-image format mode and a multiple-image format mode for use with the masking accessory kit. The kit includes a plate-form adapter attachable in fixed relation to the camera so that adapter openings register in obstructing fashion with the camera objective and viewfinder lenses. The adapter is designed to support each of a plurality of masks in at least two positions whereby separate areas of a single film frame may be successively exposed to separate light images.

8 Claims, 17 Drawing Figures

MULTIPLE FORMAT CAMERA AND ACCESSORY

BACKGROUND OF THE INVENTION

Field of the Invention

This invention relates to photographic apparatus. More particularly, it concerns a camera and camera lens masking accessory kit by which a normally automated single-image exposure and film transport cycle may be converted to a multiple image exposure sequence in which any one of several lens masks in the accessory kit may be used to establish a multiple image format.

The Prior Art

U.S Pat. Nos. 3,283,685; 3,443,499; 3,726,198; 4,140,381; and 4,175,843 are illustrative of prior patents disclosing cameras designed to expose each of several selected areas of a single photographic film frame to a separate light image. A feature common to all of the cameras disclosed in these patents, as well as other multiple format cameras of the prior art, is the inclusion of light blocking or confining means at the film plane of the camera to delineate very precisely the area of each one of a plurality of exposure frames. For example, in Cummins—U.S. Pat. No. 3,283,685 and Gianino—U.S. Pat. No. 3,443,499, cell-like partitions within the camera body confine image light from each of a plurality of objective lenses to a preestablished one of several image frame areas at the film plane; Bjork et al—U.S. Pat. No. 3,726,198 use a movable camera back to present adjacent image frame areas on a single film to a single exposure window; and Douglas—U.S. Pat. No. 4,140,381 and 4,175,843 employ movable opaque masks at the film plane to block light from all but the frame area to be exposed. Except for the camera shown in Douglas '381, all of the camera designs disclosed in the aforementioned patents additionally are confined to a given multiple image format and thus represent specialized photographic equipment as distinguished from general purpose cameras.

Although the camera disclosed in Douglas '381 is capable of adjustment to expose either one large image frame or as many as four separately exposed smaller image frames, the internal mechanism required for operation of focal plane masks in Douglas '381 is complex and costly. Also, the film transport system in this disclosure is manually operated. The additional requirement by the design for a turret carried shiftable objective lens and special shutter mechanism charactetize this camera of the prior art as one intended primarily for successive multiple image exposures and secondarily with a capability for a single image format. As such, the design of Douglas '381 falls short of a design which may be characterized as a low cost, general purpose camera with multiple image format capability.

In addition to the prior art represented by the aforementioned U.S. patents, it is known in the photographic art that separate areas of a single film frame can be exposed to different images by masking portions of the camera objective lens. For example, one half of the objective lens may be masked to expose a corresponding one half of the single film frame. Then the other half of the lens may be masked to expose the remaining half of the same film frame. This technique is used by photographers to create special effects in photographs and in some instances to save film. Masking devices used for such techniques however are usually hand made and cumbersome to use particularly by amateur photographers. Also, such techniques are very difficult if used with cameras having a completely automated exposure cycle including automatic film advance upon the completion of each exposure cycle.

SUMMARY OF THE PRESENT INVENTION

In accordance with the present invention, an existing commercially proven single-image format camera, equipped with an automated exposure cycle and a motor driven film transport system, is modified to provide a general purpose camera capable of use with a low cost multiple image format accessory, mountable directly on the camera exterior, and which provides a large choice of multiple image formats.

The multi-format accessory is embodied in an adapter which is mountable over the exterior face of the shutter housing section of the camera and which is configured to support and position any one of a set of multi-image masks. The adapter is formed with window-like openings to overlie the camera objective and viewfinder lenses as well as other portions of the shutter housing face to which access is required for operation of the camera. The adapter is of transparent light-diffusing material and covers the light detecting exposure control cell of the camera to reduce the directional sensitivity of the cell. The multi-image masks are received and positioned by the adapter to cover corresponding portions of both the objective lens and the viewfinder lens but to leave uncovered the exposure control cell for all positions of each mask.

Camera modifications involve only the addition of a manually controlled switch to enable the motorized film transport operation to be disabled for successive, multi-image exposures and of a shutter latching lever to effect a shutter latching function normally performed by the motor. In all other respects, the camera is of an existing commercially available design.

A principal object of the present invention is, therefore, the provision of a camera and multi-image accessory kit by which a wide variety of multiple image exposures may be made. Another object of the invention is the provision of a camera capable of normal, fully automated single image format photography but which is adjustable very easily to a wide range of multiple image formats. A still further object of the present invention is the provision of a versatile multi-image format camera and accessory which is inexpensive and yet which is highly effective in providing a wide variety of picture formats. Other objects and further scope of applicability of the present invention will become apparent from the detailed description to follow taken in conjunction with the accompanying drawings in which like parts are designated by like reference characters.

DETAILED DESCRIPTION OF THE PREFERRED EMBODIMENT

Figure 1:
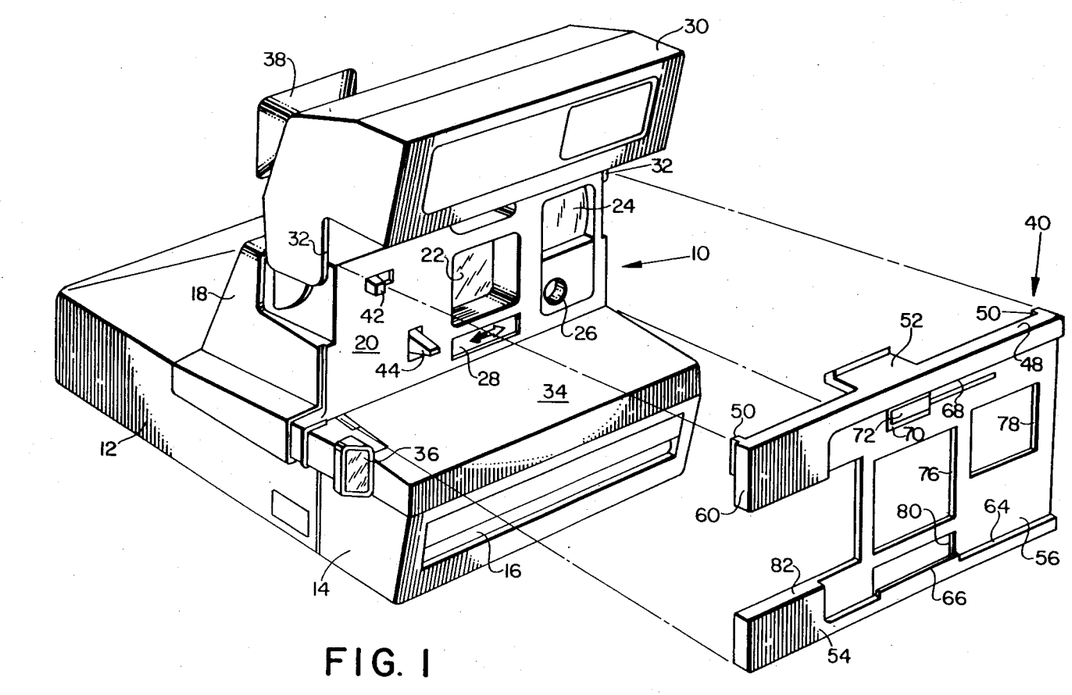
FIG. 1 is an exploded perspective view illustrating a camera and accessory adapter of the present invention.
Figure 2:
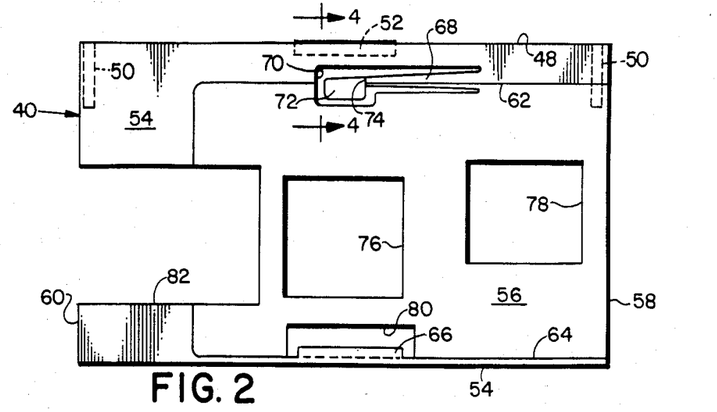
FIG. 2 is a front elevation of the adapter shown in FIG. 1.
Figure 3:
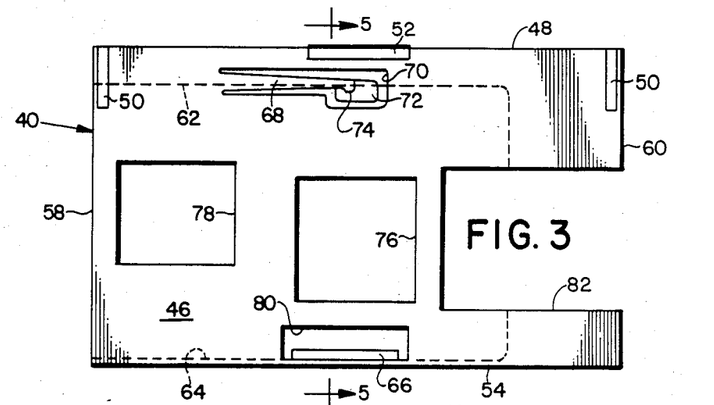
FIG. 3 is a rear elevation of the same adapter.
Figure 4:
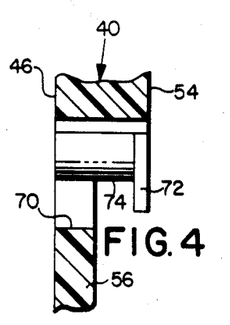
FIG. 4 is an enlarged fragmentary cross section on line 4—4 of FIG. 2.
Figure 5:
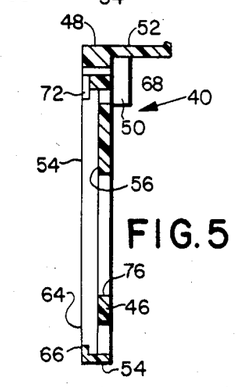
FIG. 5 is a cross section on line 5—5 of FIG. 3.

In FIG. 1 of the drawing, a photographic camera with which the present invention is particularly suited for use is designated generally by the reference numeral 10 and which is similar in all basic respects to the "600 Series" cameras currently marketed by Polaroid Corporation, Cambridge, Massachusetts. Moreover, reference may be had to such prior commonly assigned as U.S. Pat. Nos. 4,040,072 issued to Bruce K. Johnson et al on Aug. 2, 1977 and 4,231,645 issued to Carl W. Davis et al on Nov. 4, 1980 for a complete understanding of internal operating structure, control circuitry and the like. It will suffice for purposes of completely understanding the present invention that the camera 10 includes a base section 12 extending forwardly to a pivoted loading door section 14 through which a film pack (not shown) may be loaded for exposure of successive film units within the pack and discharge of each film unit after exposure through a film exit slot 16 in the loading door section 14. A shutter housing section 18 projects upwardly from the base section 12 and is defined in part by a front wall 20 which establishes the location of an objective lens 22, a viewfinder lens 24, a photocell window 26 and an exposure adjustment slide 28. A flash unit 30 is pivotably supported at depending end wall leg portions 32 from the shutter housing section 18 for movement between an erect position as illustrated in FIG. 1 and a folded position (not shown) downwardly against an apron wall 34 which extends from the front wall 20 of the shutter housing section 18 to the front portion of the loading door section 14. An exposure cycle initiating push button 36 is supported between the shutter housing section 18 and the base section 12 whereas a viewfinder eyepiece 38 projects rearwardly from the shutter housing section.

The camera 10 exemplifies currently available automatic cameras in that the only input required of an operator to expose a film unit contained in the base section 12, to transport the exposed film unit, and to ready another film unit for exposure is that of aiming the camera to frame an image observed at the viewfinder eyepiece 38 and to depress the push button 36. All exposure parameters are determined automatically and, in the specific instant camera design illustrated, the exposed film processed and presented through the film exit slot by a motor driven film transport and processing system contained within the camera 10. While the heretofore conventional operating mode to expose a film unit to a single image is retained in the camera 10, a manual override capability for motor driven film transport and shutter latching functions is provided in accordance with the present invention to permit a multiple exposure mode of operation using a mask adapter 40 shown in FIGS. 1-5 and a set of masks illustrated in FIGS. 6-10. The details of the manual override provision in the camera 10 will be described fully hereinafter with reference to FIGS. 14-17 of the drawings. It will suffice for purposes of understanding the adapter 40 and the set of masks illustrated in FIGS. 6-10, however, to note that the manipulative components of the manual override are presented on the front wall 20 of the shutter housing section on the opposite side of the objective lens 22 from the viewfinder window 24 and the photocell window 26. Specifically, the manipulative components include a motor circuit switch 42 and a shutter latch positioning toggle lever 44.

The adapter 40 is a plate-like member formed of polycarbonate, acrylic, styrene or other suitably clear or transparent plastic material. As may be seen in FIGS. 3 and 5 of the drawings, the back surface 46 of the adapter 40 is essentially planar except for the projection near the upper edge 48 thereof of a pair of ribs 50 and of a latch 52. The bottom edge 54 of the adapter 40 is essentially linear and adapted to seat against the top of the apron wall 34 of the camera 10. The ribs 50 extend to the inside of the end wall leg portions 32 of the erected flash unit 30 whereas the latch 52 engages a recess (not shown) in the bottom surface of the erected flash unit 30. Thus, and as depicted in FIG. 1, the adapter 40 is mounted to the camera 10 merely by placing the rear surface 40 thereof against the front wall 20 of the shutter housing section 18 so that it lies between the apron 34 and the underside of the erected flash unit 30. In this manner, the adapter is positioned vertically by the apron 34 and laterally by the rearwardly projecting ribs 50 engaging the depending leg portions 32 of the flash unit 30.

As may be seen in FIGS. 1, 2, 4 and 5, the front surface 54 of the adapter 40 is formed with a relatively large rectangular recess 56 opening through one end 58 of the adapter 40 and terminating short of the opposite end 60. The top and bottom edges of the recess define respective upper and lower parallel guide surfaces 62 and 64. The lower guide surface 64 is provided with an elongated and fixed retaining tab 66 spaced from the base of the recess 56 as may be seen in FIGS. 1 and 5. At the upper guide surface 62 a resilient arm 68 is cantilevered in a cutout 70 from the body of the plate-form adapter 40. The free end of the arm 68 supports a generally rectangular tab 72, which as may be seen most clearly in FIG. 4 of the drawings, is spaced from the base of the recess 56 in the same manner as the tab 66 on the lower guide surface 64 and projects downwardly from a detent 74. While the detent lies on the line of the upper guiding edge 62 of the recess 56 when the arm 68 is in a relaxed state, it will be understood that the detent 74 and the arm 68 may flex upwardly to clear the line of the edge 62.

The adapter 40 is formed with openings or windows including an objective lens window 76, a viewfinder lens window 78 and an exposure slide adjustment window 80. As may be appreciated from the illustration in FIG. 1, the windows 76, 78 and 80 will overlie the objective lens 22, the viewfinder lens 24 and the exposure adjustment slide 28 so that the adapter presents no obstruction to normal functioning of these camera components. In addition, a cutout 82 opens through the edge 60 of the adapter 40 to allow free access to the motor circuit switch 42 and the shutter latch positioning toggle lever 44.

It will be noted that no corresponding window is provided in the adapter plate 40 for the photocell window 26 of the camera 10. This is intentional and important to operation of the camera 10 in a multi-image format mode. Specifically, the material from which the adapter 40 is made, with or without surface modification, functions as a light diffuser by which the normal highly directional sensitivity of the photocell behind the window 26 is reduced. While the degree of diffusion subtracts somewhat from the light passing through the window 26 during an exposure cycle, the camera exposure system is readily adapted to accommodate the reduction of light passing the cell window 26 with the adapter 40 in place by adjusting the exposure control slide 28 toward what would normally effect an increased quantity of light passing the objective lens 22 or an increased increment of film exposure.

In FIGS. 6–9 of the drawings, a set of four masks 84, 86, 88 and 90, respectively are shown and intended to be used with the adapter 40 for an assortment of multiple image photographic formats to be described. Each of the masks illustrated in FIGS. 6–9 is similar to the extent that it is defined by a sheet of opaque material, rectangular in configuration, of a width to fit between the upper and lower side edges 62 and 74 of the recess 56 in the adapter 40 and of a thickness to be received between the tabs 66 and 72 and the base of the recess 56 in the adapter. Further, each of the masks 84, 86, 88 and 90 is provided with a pair of forwardly projecting ridges H, one on each end, which serve as handles to facilitate manipulation of the masks with respect to the recess 56 of the adapter 40 in a manner to be described. In addition, each of the masks includes at least two notches N in the side edges thereof to be engaged by the detent 72 supported by the resilient arm 68 near the top edge 62 of the adapter recess 56.

Figure 6:
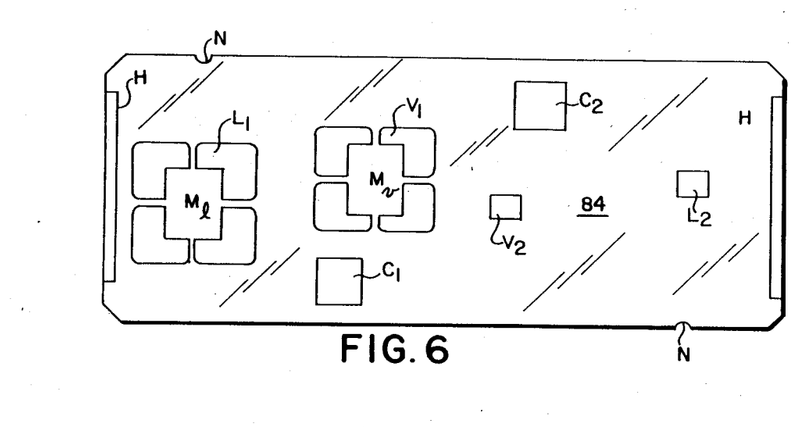
FIGS. 6-9 are front elevations illustrating four separate masks of a masking kit in accordance with the present invention.

Each mask additionally includes a plurality of openings or windows which are located to overlie the the objective lens window 76 in the adapter 40 and the camera lens 22, the viewfinder window 78 of the adapter 40 and the viewfinder lens 24 of the camera 10, and the photocell window 26 of the camera for which there is no corresponding opening in the adapter 40 as described above. In FIGS. 6–9, the mask windows are designated by the letters L, V and C where the window is intended to overlie the objective lens 22, the viewfinder lens 24 and the cell window 26, respectively. The letter designation further includes a subscript which is related to the position of each mask as established by engagement in a notch N by the detent 72 on the adapter. The letter and subscript convention used to designate the various windows in the several masks may be understood from the following description of the manner in which the mask 84 of FIG. 6 is used with the camera mounted adapter 40 and with reference to FIGS. 11-13 of the drawings.

Figure 13:
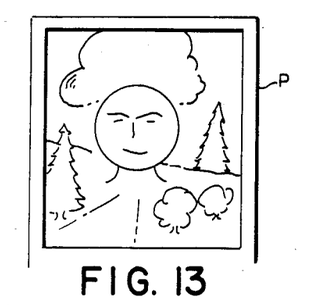
FIG. 13 is a schematic representation of a photograph taken using the masking arrangement of FIGS. 11 and 12.

The mask 84 of FIG. 6 is intended to provide the photograph P in FIG. 13 wherein a closeup of a person's head and shoulders taken by one exposure is centrally positioned relative to an encircling background scene taken by another exposure of the same film resulting in the photograph P. Thus for the exposure of the background, the mask 84 is positioned in the adapter so that the window $L_1$ overlies the objective lens window 76 in the adapter, a viewfinder window $V_1$ overlies the viewfinder window 78 in the adapter and a photocell window $C_1$ overlies the photocell window 26 in the camera 10. The windows $L_1$ and $V_1$ of the mask 84 each have a central mask segment $M_1$ and $M_v$ which, in the window $L_1$, blocks the central portion of a film unit from exposure through the lens 22. The viewfinder lens 24 is similarly masked by the window $V_1$ and its central masking portion $M_v$ so that the photographer will be able to properly frame the image to be exposed. The photocell window 26 is exposed by the window $C_1$ and through the thickness of the transparent adapter 40 as mentioned.

Figure 11:
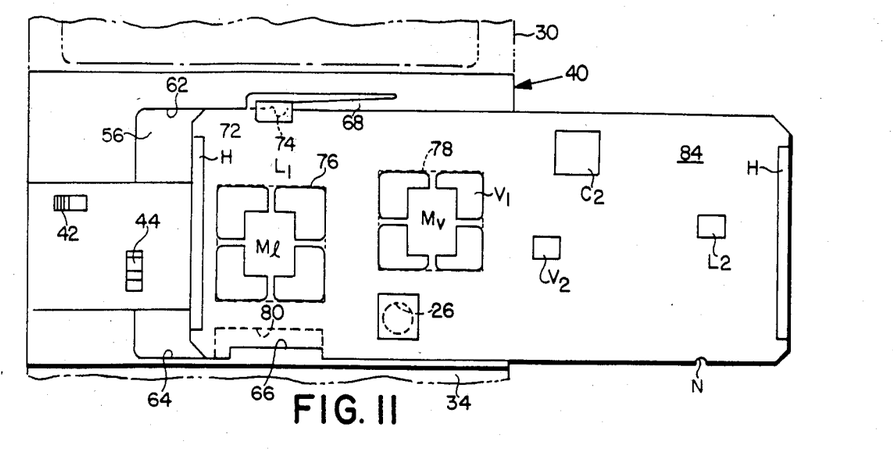
Fig. 11 is a fragmentary front elevation illustrating one position of the mask of FIG. 6 in use.
Figure 12:
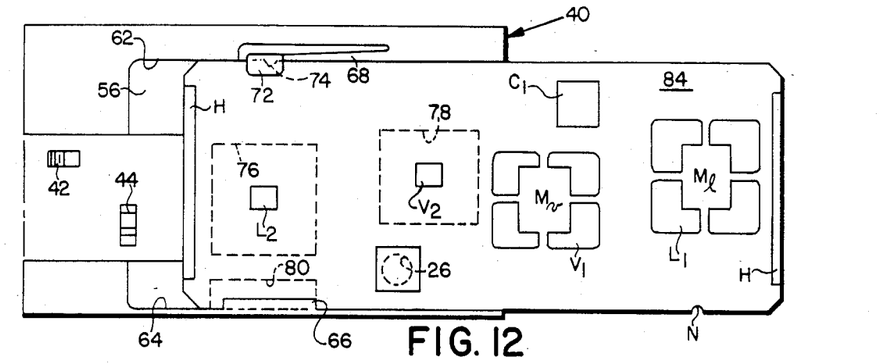
FIG. 12 is a front elevation illustrating a second position of use for the mask of FIG. 6.

After the first exposure is made with the mask 84 in the position illustrated in FIG. 11, (i.e., position "1") it is removed from the adapter 40, inverted and reinserted to the position shown in FIG. 12 in which the notch N in the opposite edge is engaged by the detent 74. In this position, (position "2"), a relatively small window $L_2$ is positioned centrally over the objective lens aperture 76 in the adapter 40 and a correspondingly small window $V_2$ is positioned over the viewfinder window 78 in the adapter. A second aperture $C_2$ is positioned over the photocell window 26. With the mask 84 in the position of FIG. 12, only the central portion of the image frame on the film unit will be exposed to provide the photograph P in FIG. 13. It is to be noted that the order of the multiple exposure sequence is not restricted to the first and second mask positions described. In other words, the center of the film unit could be exposed first and then the background images could be exposed without changes in the resulting photograph P.

Figure 7:
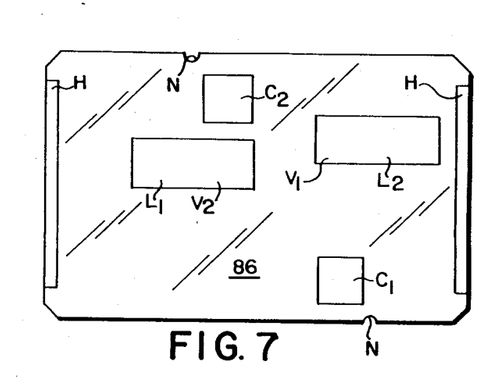
Figure 8:
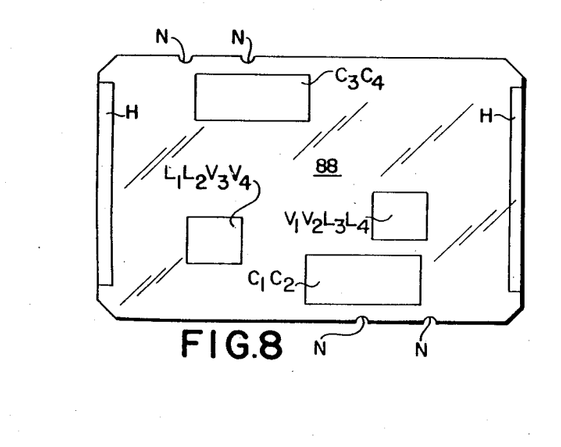
Figure 9:
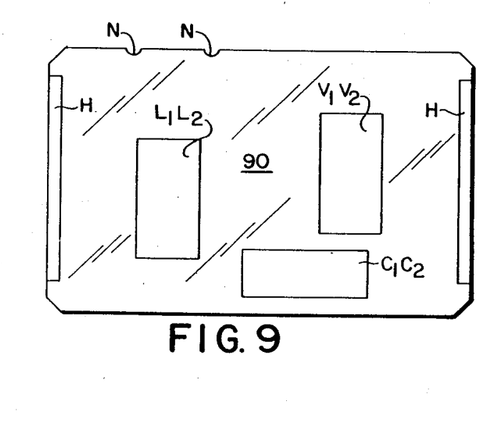
Figure 10:
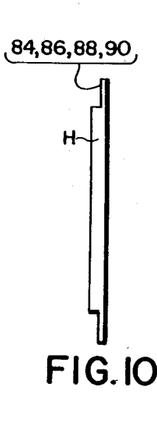
Fig. 10 is an end elevation common to all of the masks illustrated in FIGS. 6-9.

Of the remaining masks in FIG. 7, 8 and 9, the mask 86 is intended for a dual exposure in which the exposures are divided horizontally. Thus, a mask window $L_1V_2$ overlies the upper portion of the objective lens 22 in the position shown in FIG. 7 whereas a second mask window $V_1L_2$ overlies the upper half of the viewfinder. A window $C_1$ overlies the photocell window 26 when the mask is positioned as shown in FIG. 7. Upon inversion and reinsertion of the mask 86, the window $V_1L_2$ overlies the bottom half of the lens 22 whereas the window $L_1V_2$ overlies the viewfinder lens. The window $C_2$ overlies the photocell when the mask is inverted and positioned by engagement in the appropriate notch N by the detent 72.

The mask 88 in FIG. 8 may be termed a "quartering mask" in the sense that it is intended to provide four exposures of the same film unit to separate images at each quarter of the film unit. In this instance, it will be noted that two notches N are provided on both opposite edges of the mask 88. Thus, when positioned as shown in FIG. 8, the window $L_1L_2V_3V_4$ overlies one of two lower quarters of the objective lens 22 whereas the window $V_1V_2L_3L_4$ overlies corresponding quarters of the viewfinder lens 24. The upper quarters of the objective and viewfinder lenses are positioned under the two mask windows when the mask 88 is inverted. The photocell windows $C_1C_2$ and $C_3C_4$ overlie the photocell window 26 in each of the four positions of the mask 88.

In FIG. 9, a mask 90 is shown and intended to provide dual exposure in which the two exposures are separated vertically. In this instance, the two notches N on one side of the mask 90 are alternately engaged by the detent 72 so as to present a window $L_1L_2$ first to one half and then to the second half of the objective lens and similarly positioned a viewfinder window $V_1V_2$ with respect to the viewfinder lens. One opening $C_1C_2$ overlies the photocell window 24 for both positions of the mask 90.

In using any one of the masks of the set illustrated in FIGS. 6-9, it will be appreciated that for each exposure of a single film unit contained in the base section 12 of the camera 10, the shutter actuating button 36 must be depressed to actuate the camera shutter as well as other exposure control devices. Because the camera 10 normally operates to eject a film unit from the exit slot 16 each time the actuating button 36 is depressed, operation of internal camera components affecting film transport and shutter actuation must be altered during use of the masks to effect multiple exposure of a single film unit. As indicated above, the camera includes a manual override provision presented to the camera operator by way of the motor circuit switch 42 and the toggle lever 44 on the front wall of the camera shutter housing 18.

To provide a clear understanding of the manner in which the switch 42 and toggle lever 44 alter the internal camera operating components and circuitry, reference is made to FIGS. 14-17 of the drawings. These figures are substantially extracted from the drawing illustrations of the above-mentioned U.S. Pat. Nos. 4,040,072 and 4,231,645 but modified to include the motor circuit switch 42 and the toggle lever 44. In the ensuing discussion, therefore, the description of components fully described in the aforementioned patents will be merely summarized adequately to understand the manner in which the override components of the present invention are used in practice to change the camera 10 from a conventional operating mode in which each film unit is exposed to one image to the multi-image format employing the masks of FIG. 6-9. The disclosures of U.S. Pat. Nos. 4,040,072 and 4,231,465 are incorporated herein by reference to the extent that they are needed for a full understanding of the prior operating systems they represent.

Figure 14:
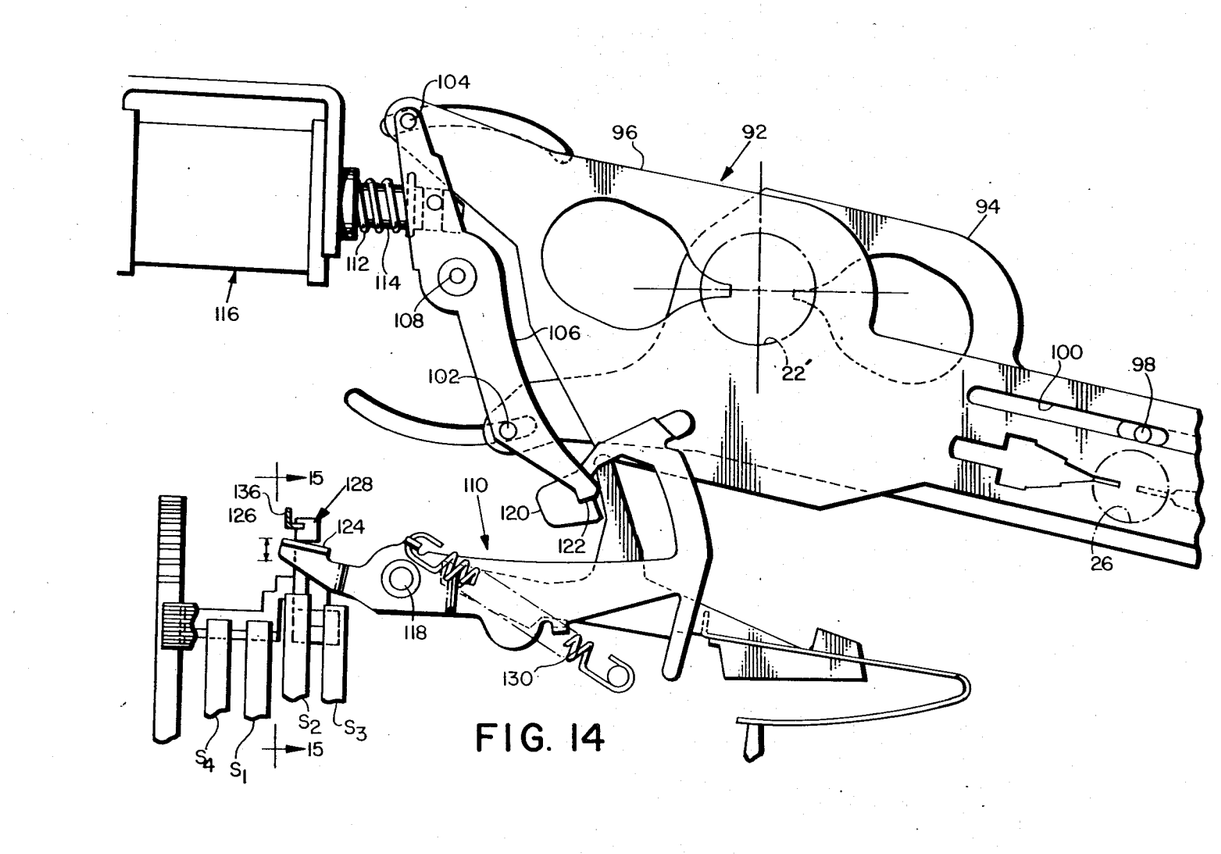
FIG. 14 is an enlarged front elevation illustrating the shutter mechanism of the camera illustrated in FIG. 1.
Figure 15:
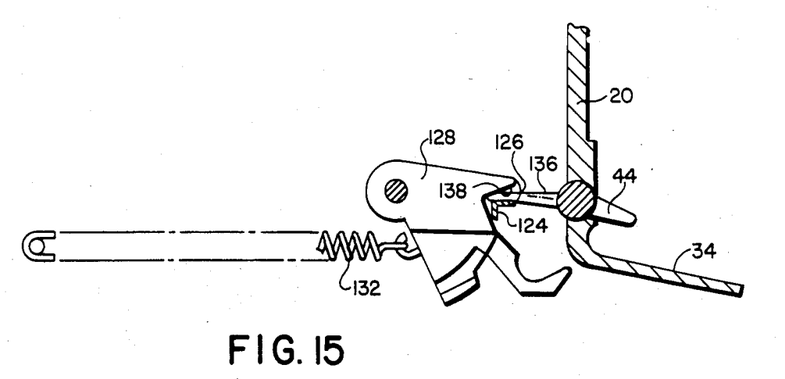
FIG. 15 is a fragmentary cross section on line 15—15 of FIG. 14.
Figure 16:
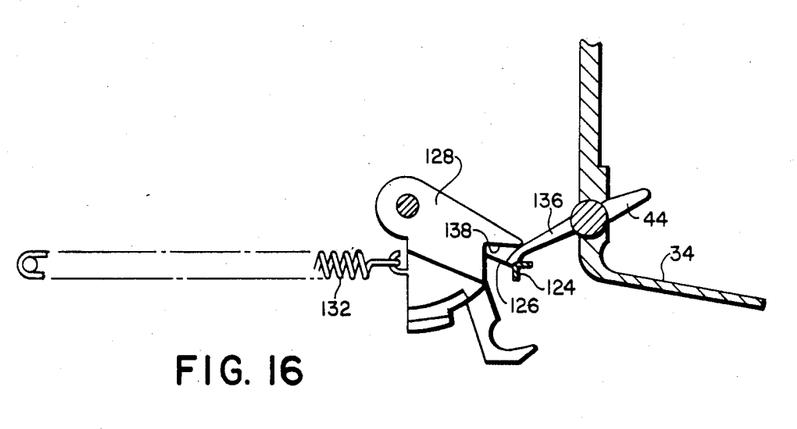
FIG. 16 is a view similar to FIG. 15 but with illustrated components in a different orientation.

In FIG. 14, a shutter mechanism of the prior art is shown and generally designated by the reference numeral 92. The shutter 92 conventionally employs a pair of shutter blades 94 and 96 slidably supported at one end by a fixed pin 98 engaging in slots 100 formed in the respective blades. The opposite ends of the blades are pivotally connected by pins 102 and 104 to a walking beam 106 pivoted centrally on a bearing pin 108. The blades 94 and 96 are shown in a closed condition over an objective aperture 22' in which they are retained by a latch 110 against the bias of a compression spring 112 circumscribing the plunger 114 of an actuating solenoid 116. The latch 110 is in the nature of an arm pivoted on a pin 118 and having a hook 120 at one end to engage a tang 122 projecting from one end of the walking beam 106 when the shutter 92 is closed. A latch release pad 124 is positioned at the opposite end of the latch lever 110 to underlie an armlike formation 126 on an actuator 128. The latch 110 is biased by a relatively weak tension spring 130 in a direction favoring engagement of the walking beam tang 122 by the latch hook 120. The actuator 128, on the other hand, and as shown in FIGS. 15 and 16, is biased by a relatively heavy spring 132 in a direction tending to pivot the latch 110 against the light bias of the spring 130 to a position free of the tang 122 on the walking beam 106. Also as shown in FIG. 14, the actuator 128 is positioned to operate a pair of switches $S_2$ and $S_3$. A switch $S_1$ is actuated directly by the push button 36.

Figure 17:
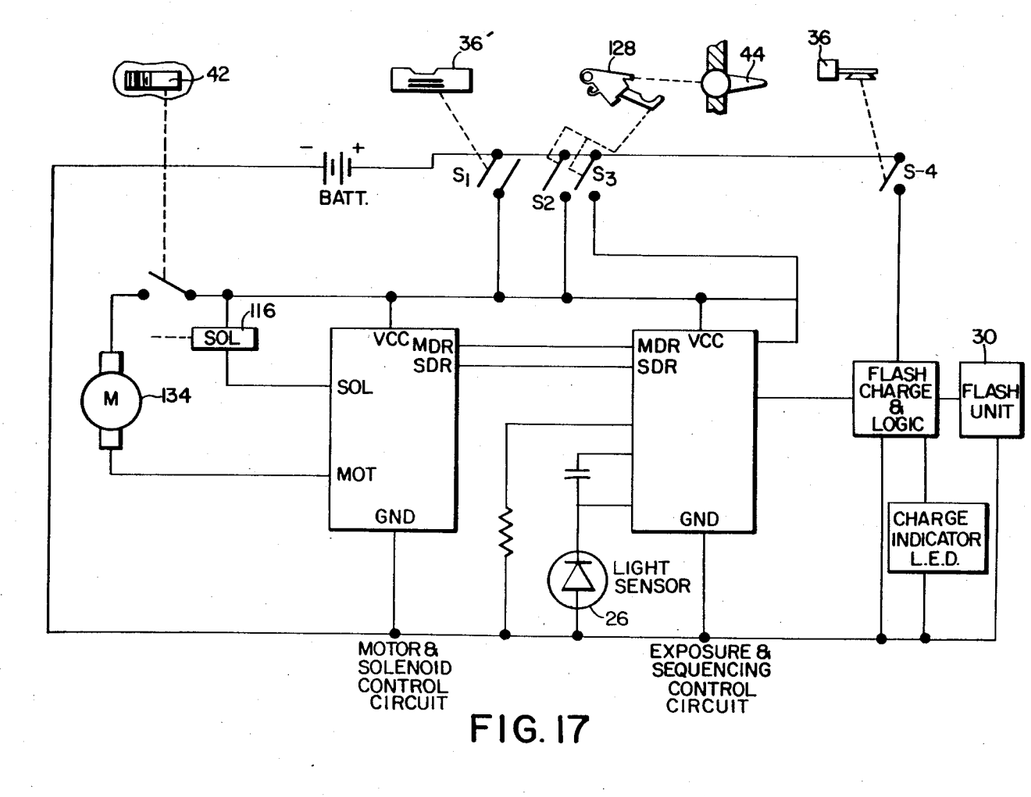
FIG. 17 is a circuit diagram of control components incorporated in the camera of FIG. 1.

Conventional or normal operation of the shutter 122 and of the switches $S_1$, $S_2$ and $S_3$ may be summarized with reference to FIGS. 14 and 17 of the drawings. Thus for single image operation, depression of the actuating button 36 effects movement of a slide 36' (FIG. 17) to close the switch $S_1$ and energize the solenoid 116. When the solenoid is on, it pulls the upper portion of the walking beam 106 in a direction tending to further close the shutter blades 94 and 96. Such movement frees the tang 122 on the walking beam 106 from the latch hook 120, allowing the relatively strong spring bias of the actuator 128 to pivot the hook 120 upwardly out of engagement with the tang 122. As the actuator 128 moves under the bias of the spring 132 to release the latch 110, it effects closure of the switches $S_2$ and $S_3$. As soon as the switches $S_2$ and $S_3$ are closed, the exposure and sequencing control circuit of FIG. 17 takes over control of the solenoid 116 as well as the operation of other internal camera components. The switch $S_1$ may reopen by release of the push button 36 without affecting operation through a complete exposure cycle.

The single-image exposure cycle proceeds by turning the solenoid 116 off, allowing the spring 112 to advance the shutter blades 94 and 96 toward an open condition. When a proper exposure interval and aperture setting is detected by the exposure and sequencing control circuit through the photocell presented at the window 26 of the camera 10, the solenoid 116 is reenergized to close the shutter blades 94. Normally at this time, a drive motor 132 (FIG. 17) is energized to initiate transport of the exposed film unit toward the processing rollers (not shown) contained in the door section 14 behind the exit opening or slot 16. As the motor 132 reaches the end of its operation, the actuator 128 is pivoted by the motor against the spring 132 to a position allowing the hook 120 on the latch 110 to engage the tang 122 on the walking beam 106 and latch the shutter in a closed condition. Such movement of the actuator 128 also reopens the switches $S_1$ and $S_2$. The reopening of the switches $S_2$ and $S_3$ deenergizes the solenoid and returns the shutter mechanism to the position shown in FIG. 14.

As may be seen in FIG. 17, the motor circuit switch 42 presented on the face 20 of the camera 10, in accordance with the present invention, simply opens the circuit to the motor 134 in one position and closes the motor circuit in another position to allow normal single image exposure in the manner described above. The toggle lever 44, on the other hand, is a mechanical device which may be understood by reference to FIGS. 15 and 16. Specifically, the toggle lever 44 has a rearwardly extending arm 136 which is engageable under an arm-like portion 138 of the actuator 128. The toggle lever is freely pivotal on its axis in the front wall 20 of the shutter housing section 18 and thus will not affect normal single-image operation of the camera 10. In multi-image operation however, with the switch 42 adjusted so that the motor 134 will not operate, the toggle lever 44 enables operation of the latch 110 to retain the shutter 92 in a closed condition as well as to open the switches $S_2$ and $S_3$ to return the electric circuitry of FIG. 17 to its inactive or open state. In particular, after an exposure in the multi-image exposure mode has been made, the toggle lever 44 is merely pushed downwardly to raise the actuator 128 against the bias of its spring 132 to first position the latch 110 to engage the tang 122 on the walking beam 106 and then open the switches $S_2$ and $S_3$. With the shutter 92 latched in its closed condition and the electric circuit of FIG. 17 deenergized, the masks may be manipulated as described above and a subsequent exposure initiated simply by again depressing the actuating button 36. After the last of the multiple exposures has been taken, the lever 44 is left in the position to which it was moved by the actuator 128 and the switch 42 closed to energize the motor 134 and eject the multi-image exposed film unit through the exit slot 16 of the camera.

Thus it will be appreciated that as a result of the present invention, a highly versatile camera and accessory kit is provided by which conversion from single image frame exposure to multi-image exposure in a variety of different formats may be achieved. While the invention is particularly applicable to the type of camera illustrated in the drawings, it is equally applicable to other forms of cameras equipped with fully automated exposure and film transport cycles of operation. It is contemplated therefore, and will be appreciated by those skilled in the art from the preceeding description and accompanying drawing illustrations, that modifications may be made in the disclosed embodiment without departure from the invention. Accordingly, it is expressly intended that the foregoing description and accompanying drawings are illustrative of a preferred embodiment only, not limiting, and that the true spirit and scope of the present invention will be determined by reference to the appended claims.

What is claimed is:

1. In photographic apparatus including a camera having an objective aperture and an automated exposure and film transport system operable normally to expose the image frame of a single film unit to a single light image, the improvement comprising in combination:

manually operated override means accessible on the camera exterior for altering camera operation between a normal automated single-image format mode and a multiple-image format mode; and a masking accessory kit including an adapter mountable on the camera in fixed relation to the objective aperture, at least one mask adapted for multipositional support by said adapter, and means for establishing at least two positions of said mask in said adapter and relative to the camera objective aperture, said automated exposure and film transport system including directional photosensitive means spaced from said exposure aperture, and said adapter comprises at least a transparent portion to lie in the path of said photosensitive means and diffuse light passing thereto as so to diminish the directional response of said photosensitive means.

2. The photographic apparatus of claim 1 wherein said camera includes exposure adjustment means to compensate for diffusion of light by said transparent portion of said adapter.

3. A multiple exposure accessory kit for a photographic camera having an objective lens, a viewfinder lens and a photocell presented at a forwardly facing exterior camera wall, said kit comprising:

a set of opaque masks, each of said masks having at least one objective lens window, at least one viewfinder lens window, and at least one photocell window, each of said lens windows being of a configuration to block light from corresponding masked portions of said objective lens and of said viewfinder lens and to pass light through corresponding unmasked portions of said objective lens and of said viewfinder lens;

a plate-like adapter of a configuration to overlie said exterior camera wall, said adapter having openings to register in unobstructing fashion with said objective lens and said viewfinder lens;

means for fixing the position of said adapter on said exterior camera wall with said openings in registry with said lenses; and means on said adapter for receiving each of said masks and for fixing each of said masks in at least two positions in which at least one photocell window is in unobstructing registration with said photocell.

4. The accessory kit of claim 3 wherein said adapter is transparent and covers the photocell to reduce directional sensitivity thereof.

5. The accessory kit of claim 3 wherein said masks are generally rectangular to establish opposite parallel edges and wherein said means on said adapter for receiving said mask comprises a generally rectangular recess defining opposed edges for slidably engaging said opposite parallel edges of said masks.

6. The accessory kit of claim 5 wherein the base of said recess is spaced inwardly of a pair of tabs positioned to overlie said parallel edges of said masks.

7. The accessory kit of claim 6 wherein one of said tabs is supported by a resilient arm carrying a detent behind said one tab.

8. The accessory kit of claim 7 wherein each of said masks includes at least two notches in said parallel edges for positional engagement by said detent.

* * * * *